United States Patent [19]

Koga et al.

[11] Patent Number: 4,942,476
[45] Date of Patent: Jul. 17, 1990

[54] RECORDING SYSTEM FOR RECORDING ON A ROM IMAGE SIGNAL INFORMATION WHICH HAS BEEN SUBJECTED TO EFFICIENT REDUNDANCY CODING

[75] Inventors: Toshio Koga; Junichi Ohki; Mutsumi Ohta, all of Tokyo; Hideto Kunihiro, Osaka, all of Japan

[73] Assignees: NEC Corporation; NEC Home Electronics Ltd., both of Japan

[21] Appl. No.: 189,138

[22] Filed: May 2, 1988

[30] Foreign Application Priority Data

Apr. 30, 1987 [JP] Japan ................................ 62-108351

[51] Int. Cl.⁵ .......................... H04N 5/76; H04N 5/92
[52] U.S. Cl. ..................................... 358/335; 358/135; 358/136; 360/8; 360/33.1
[58] Field of Search ................ 358/280, 310, 335, 133, 358/135, 136, 12–15; 360/33.1, 8; 371/30

[56] References Cited

U.S. PATENT DOCUMENTS 4,807,053 2/1989 Heijnemans ........................ 360/10.1

Primary Examiner—Robert L. Richardson

Attorney, Agent, or Firm—Ostrolenk, Faber, Gerb & Soffen

[57] ABSTRACT

In a recording system, a sequence of image signals obtained from a sequence of images are used to generate and record a sequence of recordable signals on a read only memory. Efficient coding of the received sequence of image signals is carried out through the use of a given parameter which is adaptively and dynamically changed, preferably manually, through a parameter controller acting as the interactive device. The image signals are repeatedly subjected to the efficient coding process. The process uses a sequence of predictive signals to produce coded signals. The predictive signals are displayed on a monitor display device to be monitored by an operator. The operator changes the attributes of the parameter until an optimum image is obtained. The optimum parameter is stored on a magnetic tape. The image signals subjected to the efficient coding enable the production of a sequence of coded image signals which are recorded on the read only memory in synchronism with the optimum parameter, after the optimum image has been obtained.

4 Claims, 3 Drawing Sheets

RECORDING SYSTEM FOR RECORDING ON A ROM IMAGE SIGNAL INFORMATION WHICH HAS BEEN SUBJECTED TO EFFICIENT REDUNDANCY CODING

BACKGROUND OF THE INVENTION

This invention relates to a recording system for use in coding a sequence of image signals into a sequence of coded image signals and in recording the coded image signal sequence on a main image recording medium.

Attempts have been made to provide a reproduction system which uses a read-only memory in the form of a compact disk (abbreviated to a CD-ROM hereinafter) as an image source for education or amusement purposes. For convenience of reference, the CD-ROM will be referred to below as "a main image recording medium".

According to CCIR Recommendation 601 which defines a specification for CD-ROMS, CD-ROMS should have a maximum readout rate of 150 kilobytes and a memory capacity of 540 megabytes. As long as the CD-ROM complies with this specification, i.e., standard, a single frame of image signals should be coded into a coded signal of 5 kilobytes, with the condition that thirty frames of image signals appear for one second. It is difficult, if not impossible, to condense such a frame into 5 kilobytes of data. Therefore, efficient coding or redundancy reduction coding is indispensable for recording or reproducing the image signals. Otherwise, it is impossible to reproduce a sequence of moving images from the CD-ROM. Efficient coding will be more simply referred to herein as information reduction.

If information reduction is possible such that a single frame of the image signals is coded into a coded signal of 5 kilobytes, a lengthy reproduction of about would be storable on a CD-ROM.

Recently, a proposal has been offered as regards a color image recording CD-ROM which realizes a reproduction of about one hour, as a usual audio signal recording CD-ROM. In this case, an image signal is recorded on the color image recording CD-ROM in the form of a predictive error signal appearing as a result of efficient coding carried out in a manner to be described later. Such efficient coding may be, for example, interframe coding. When the interframe coding is used to code an image including a still portion and a moving portion having a small area in comparison with the still portion, it is possible to reduce the amount of significant information at the still portion.

However, use of such interframe coding renders an area of the moving portion undesirably small as compared with an actual area thereof on a reproduction of the image. When the image includes the moving portion which is quickly moving, loss of scene information might take place in the interframe coding. This results in a reduction of both frame rate and spacial resolution. Such a reduction of a frame rate gives rise to a degradation of temporal resolution and therefore to blurring of a reproduced image.

SUMMARY OF THE INVENTION:

It is an object of this invention to provide a recording system which can record an optimum coded image signal on a main image recording medium, such as a CD-ROM.

It is another object of this invention to provide a coded image signal recording system of the type described, wherein a moving portion is also recorded in the main image recording medium with a high spacial resolution and without a reduction of frame rate.

A recording system to which this invention is applicable is usable in recording a sequence of recording signals on a main image recording medium. The recording signal sequence is produced by subjecting a sequence of image signals representative of a sequence of images, respectively, to redundancy reduction coding of the redundancy reduction coding type under a coding condition determined by a sequence of predetermined parameters. According to this invention, the recording system comprises controlling means for adaptively controlling the predetermined parameters into controlled parameters in correspondence to the image signals and to optimize the controlled parameters into optimized parameters, an additional image recording medium for memorizing the image signals together with the controlled parameters, readout means coupled to the additional image recording medium for reading the controlled parameters out of the additional image recording medium as a sequence of readout parameters, coding means responsive to the image signals and coupled to the readout means and the controlling means for coding the image signals into a sequence of coded signals in accordance with the readout controlled parameters, combining means coupled to the readout means and the coding means for combining the coded signal sequence and the readout controlled parameters into a combined signal, and means for writing the combined signal into the main image recording medium as the recording signal sequence when the controlled parameters are defined as the optimized parameters.

Figure 1:
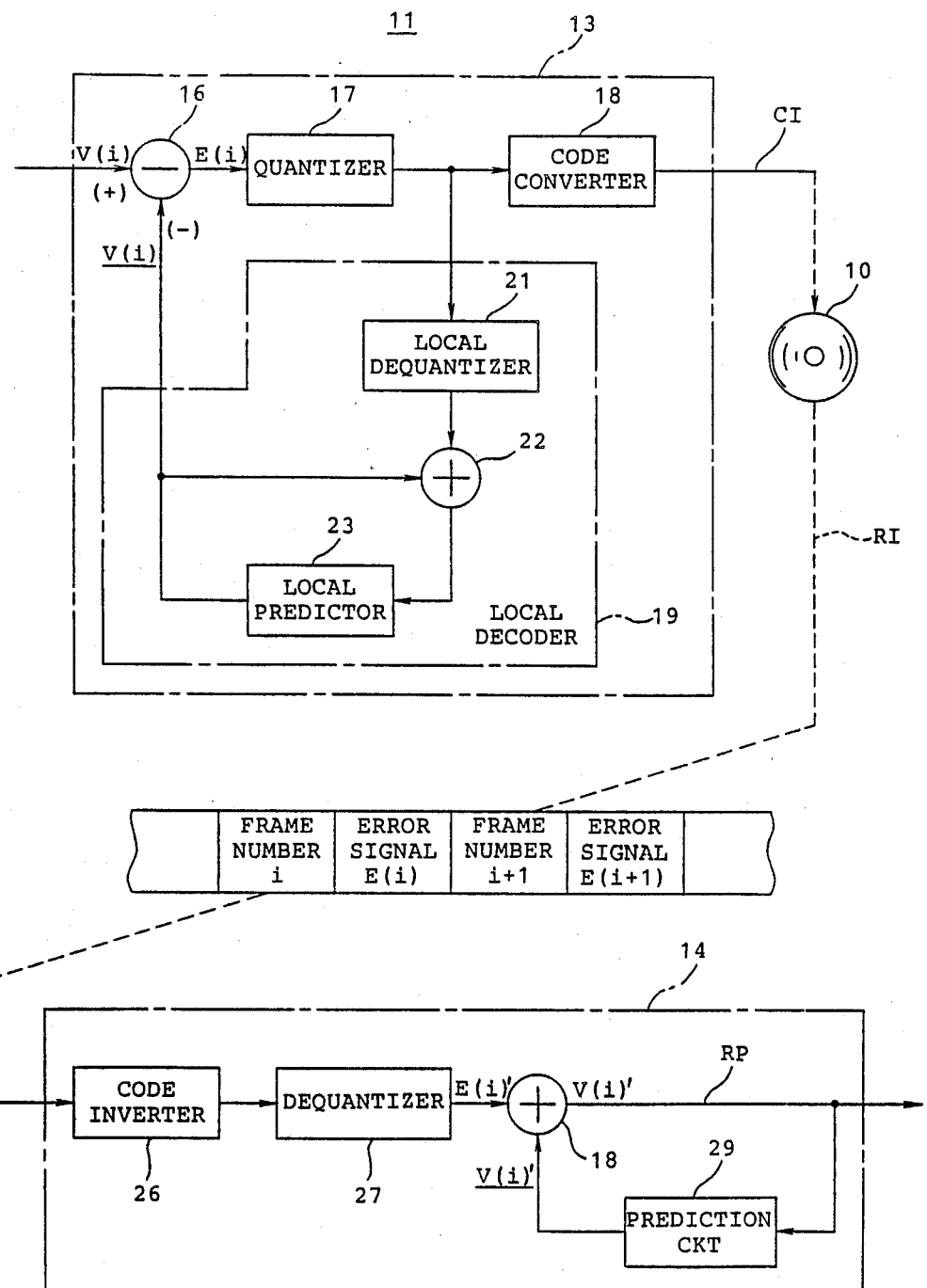
FIG. 1 is a block diagram of a system which can proceed from a conventional technique to record and reproduce a sequence of image signals in accordance with the present invention.

DESCRIPTION OF THE PREFERRED EMBODIMENT:

Referring to FIG. 1, a system which might be formed by the use of a conventional technique to record a sequence of coded image signals CI on a CD-ROM 10 and to reproduce a sequence of recorded signals RI from the CD-ROM 10 will be described first. The illustrated system comprises a recording section 11 and a reproducing section 12 for use with the CD-ROM 10. The recording section 11 is represented by a coder 13 for coding a sequence of image signals V into the coded image signal sequence CI while the reproducing section 12 is represented by a decoder 14 for decoding the recorded signal sequence RI into a sequence of reproduced image signals RP.

The coder 13 is supplied with the image signal sequence V which may be a digital signal sequence and which is divided into a succession of frames. Each of the frames carries a plurality of picture elements, as well known in the art. It is assumed that the illustrated coder 13 carries out predictive coding which is known in the art as interframe differential pulse code modulation (DPCM). Therefore, the image signal of an i-th one of the frames V is represented by V(i). In this connection, the predictive coding may be often called interframe coding and is very effective to process a television signal which has a strong correlation between frames and a small difference or error therebetween. Interframe and intraframe coding are described, for example, in an article by H. Kaneko et al in IEEE Communications Magazine (Jul. 1980), pages 14–22, and will not be described in detail.

In FIG. 1, the image signals V are successively supplied to a subtracter 16 which is supplied with a sequence of predictive value signals V(i) representative of predictive values obtained in a manner to be described later. The subtracter 16 successively calculates an error or difference between each image signal V(i) of the i-th frame and each predictive value signal V(i) to produce a sequence of error signals E(i) indicative of the error.

The error signals E(i) are succesively sent to a quantizer 17 where they are quantized into a sequence of quantized signals. In general, it is known in the art that a distribution of errrors between the image signals of the frames can be approximated by a Laplace distribution which is specified by a nonlinear curve. Taking this into consideration, the quantizer 17 has a nonlinear quantization characteristic. The quantized signals are succesively delivered to a code converter 18 on one hand and to a local decoder 19 on the other hand. The code converter 18 converts the quantized signals into variable length code signals representative of variable length codes and is thereafter stored as the coded image signals CI on the CD-ROM 10.

The illustrated local decoder 19 comprises a local dequantizer 21 which locally dequantizes or inversely quantizes the quantized signals into a sequence of local dequantized signals which are local reproductions of the error signals E(i) and which are sent to an adder 22. The adder 22 is supplied with the predictive value signals V(i) from a local predictor 23 to sum up the predictive value signals V(i) and the local dequantized signals and to produce a sequence of sum result signals. The local predictor 23 comprises a delay circuit having a delay time equal to a single frame time and successively delays the sum result signals for a single frame interval of time. At any rate, the local predictor 23 delivers the predictive value signals V(i) to both the subtracter 16 and the adder 22. Thus, the image signals V(i) are successively coded into the coded signals CI by the abovementioned predictive coding and stored into the CD-ROM 10. In this event, the illustrated coded signals CI carry not only each image signal of the frames but also a frame number of each image signal.

On the other hand, the recorded signals RI are successively read out of the CD-ROM 10 and are supplied to a code inverter 26 for inverting the recorded signals RI into a sequence of code inverted signals each of which has an invariable length. The code inverted signals are sent to a dequantizer 27 to be dequantized into a sequence of dequantized signals which represent reproductions of the error signals E(i) produced by the coder 13 and which are therefore represented by E(i)' in FIG. 1. The dequantized signals E(i)' are delivered to an adder circuit 28 which is supplied with a sequence of prediction signals V(i)' from a prediction circuit 29 which prediction signals are substantially equivalent to those at the local predictor 23 of the coder 13. The prediction signals V(i)' are added to the dequantized signals E(i) by the adder circuit 28 and are thereby converted into the reproduced image signals RP in known manner.

Figure 2:
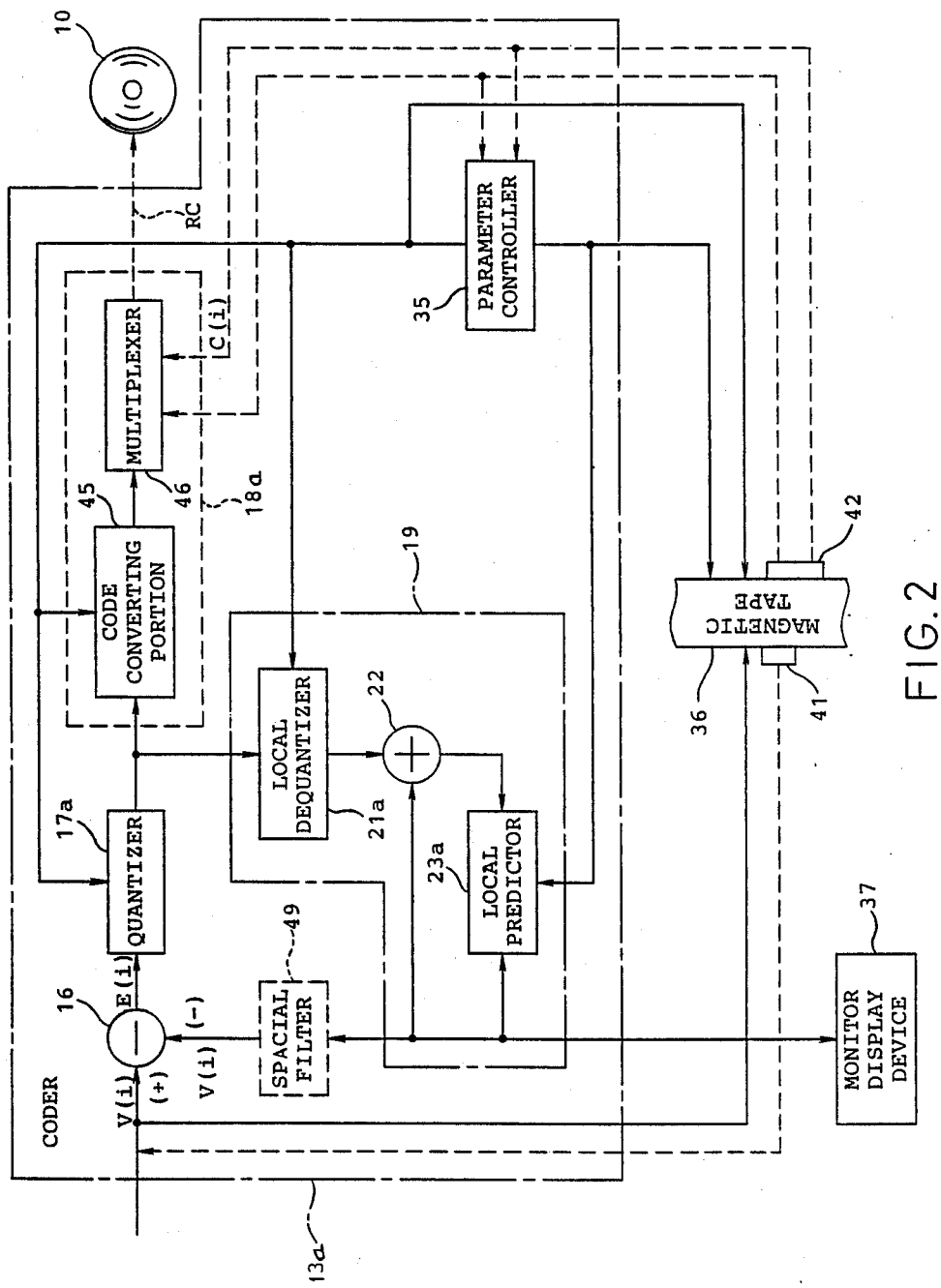
FIG. 2 is a block diagram of a recording system according to a preferred embodiment of this invention.

Referring to FIG. 2, a coded image signal recording system according to a preferred embodiment of this invention comprises similar parts designated by like reference numerals. As in FIG. 1, the recording system is supplied with a sequence of image signals V(i) from an external device, such as a video memory, and serves to record a sequence of recording signals RC on a CD-ROM 10, i.e., a main recording medium. The illustrated coder is depicted at 13a and comprises a quantizer 17a, a local predictor 23a, a code converter 18a, and a local dequantizer 21a, all of which can adaptively control parameters used in quantization, prediction, and code conversion, respectively.

It is assumed here that the illustrated local predictor 23a is adaptively operable in accordance with predictive functions that may determine interframe coding or intraframe coding while the code converter 18a can adaptively carry out subsampling operations. In addition, the quantizer 17a is adaptively operable in accordance with quantization steps defined by quantization characteristics. Under the circumstances, the parameters may serve to determine operational conditions, such as the predictive functions of the local predictor 23a, subsampling rates of the subsampling operations of the code converter 18a, and the quantization steps of the quantizer 17a.

In the example being illustrated, the parameters are controlled by a parameter controller 35 which may act as a man-machine interface or man-machine interactive device and which is included in the coder 31. Although the illustrated parameter controller 35 controls each of the quantizer 17a, the code converter 18a, the local predictor 23a, and the local dequantizer 21a, it is possible that it should control only one or several of the quantizer 17a, the code converter 18a, and the local predictor 23a alone.

In FIG. 2, it is to be noted that the illustrated system further comprises a magnetic tape 36 which acts as an erasable memory and which may be called an additional recording medium and a monitor display device 37. The magnetic tape 36 may be a video tape which is usable in a home video tape recorder having a single image channel and three audio channels. In such a video tape, an image track is assigned to both the image channel and two of the audio channels for a high fidelity audio signal while an audio track is assigned to the remaining one of the audio channels for recording a normal audio signal.

The magnetic tape 36 is coupled to the parameter controller 35 and responds to the image signals V(i) through recording heads (not shown).

In operation, the image signals V(i) are successively sent to both the subtracter 16 and the magnetic tape 36. The subtracter 16 subtracts the predictive value signal V(i) from the image signals to successively produce a sequence of error signals E(i), in the manner illustrated in FIG. 1. On the other hand, the image signals V(i) are successively recorded on the image track of the magnetic tape 36 in a manner to be described in detail.

In this event, the quantizer 17a, the code converter 18a, and the local predictor 23a carry out the quantization, the conversion, and prediction functions in accordance with a selected quantization step, a selected subsampling rate, and a selected predictive function determined by the parameter controller 35 which is manually controlled by an operator (not shown). Like the quantizer 17a, the local dequantizer 21a is also operated by a selected dequantization characteristic set in the parameter controller 35 by the operator.

The selected quantization step, subsampling rate, predictive function, and dequantization characteristic will be collectively called the "selected parameters". The selected parameters are sent from the parameter controller 35 to the quantizer 17a, the code converter 18a, the local predictor 23a, and the local dequantizer 21a and are also delivered to the magnetic tape 36 to be recorded on the audio channel thereof in synchronism with the image signals V(i).

Under the circumstances, the error signal E(i) is successively quantized by the quantizer 17a into the quantized signal in accordance with the selected quantization step. Nonlinear quantization may be carried out in the quantizer 17a, as in the quantizer 17 shown in FIG. 1.

The quantized signal is delivered from the quantizer 17a to both the code converter 18a and the local dequantizer 21a. The quantized signal is subjected to code conversion by the code converter 18a and is thereby converted into the coded image signals CI in accordance with the selected subsampling rate determined by the parameter controller 35. It is to be kept in mind that the coded image signals have not at this point been recorded on the CD-ROM 10. On the other hand, the local dequantizer 21a dequantizes the quantized signal into a local dequantized signal under the selected dequantization characteristic determined by the parameter controller 35. The dequantized signal is added by the adder to the predictive value signal V(i) sent from the local predictor 23a. The local predictive value signal V(i) is sent to both the adder 22 and the subtracter 16 in the manner illustrated in FIG. 1 and displayed on the monitor display device 37 as a reproduced image and is visually monitored by the operator. The operator can manually vary the selected parameters through the parameter controller 35 so as to obtained determine optimum parameters which reflect the operators choices. For this purpose, the operator varies the selected parameters, such as the selected quantization step, subsampling rate, and predictive function, to different or controlled values at will. In this situation, the same image signals V(i) are sent from the external device again and coded into a different predictive value signal V(i) in accordance with the different or the controlled parameters. The image signals V(i) may be recorded on the magnetic tape 36 in synchronism with the different parameters. In this case, only the different parameters may be recorded on the magnetic tape 36.

The different predictive value signal V(i) is monitored by the operator on the monitor display device 37. As a result of monitoring an image displayed on the monitor display device 37, the operator changes the parameters to another set of the parameters, if necessary. Another set of the parameters is recorded on the magnetic tape 36. The operator repeats these procedures again and again, watching the monitor display device, until an optimum image is obtained.

The optimum image for the operator is allowed to be displayed on the monitor display device 37 through trial and error. This means that an optimum predictive value signal V(i) is produced by the adder 22 as a local decoded signal. In this event, optimum ones of the parameters Ci for the optimum image are recorded on the audio track of the magnetic tape 36 with the image signals V(i) recorded on the image track 37 of the magnetic tape 36. Under these circumstances, i.e., at this point, the operator allows the recording signals RC to be recorded on the CD-ROM 10.

On recording the optimum image on the CD-ROM 10, the optimum parameters Ci are read out of the magnetic tape 36 and delivered to the parameter controller 35 to be set therein, as shown by a pair of broken lines. As a result, the quantizer 17a, the code converter 18a, the local dequantizer 21a, and the local predictor 23a are operated in accordance with the optimum parameters Ci. Thereafter, the image signals V(i) and the optimum parameters Ci are synchronously read out of the magnetic tape 36. The readout image signals V(i) are delivered to the subtracter 16, as shown by a broken line and are subjected to the predictive coding and the code conversion into a sequence of optimum coded image signals in the above-mentioned manner. On the other hand, the optimum parameters Ci are delivered as readout optimum parameters from the magnetic tape 36 to the code converter 18a, also as shown by broken lines. To this end, magnetic heads depicted at 41 and 42 are magnetically coupled to the magnetic tape 36 and may be collectively referred to as a readout member.

The code converter 18a can automatically and successively add a frame number to each of the optimum coded image signals at every frame, as illustrated in FIG. 1. In addition, the code converter 18a serves to combine the optimum parameters Ci with the optimum coded image signals into a sequence of recording signals RC. From this, it is readily understood that the code converter 18a comprises a code converting portion 45 and a multiplexer 46 coupled to the code converting portion 45. The code converting portion 45 is coupled to the quantizer 17a and the parameter controller 35 to subject the quantized signal to code conversion in accordance with the parameters given by the parameter controller 35 and to produce the coded image signals. In this connection, the combination of the local decoder 19, the subtracter 16, the quantizer 17a, and the code converting portion 45 may be referred to collectively as a coding circuit for converting the image signals V(i) into the coded image signals each of which is represented by a variable length code and which is automatically preceded by a frame number in the manner mentioned in conjunction with FIG. 1. In addition, the multiplexer 46 combines or multiplexes the coded image signals and the frame number with the optimum parameters sent from the parameter controller 35 into a combined signal. The combined signal is written into the CD-ROM as the recording signal sequence RC after the optimized parameters are determined by the operator.

With this system, the image signals V(i) are repeatedly supplied from the external device to the recording system. This means that the operator repeatedly watches these images on the monitor display device 37 and can anticipate not only past images but also future images on the monitor display device 37. Therefore, the optimum parameters can be determined by the operator with reference to the future images together with the past images. In FIG. 1, the quantizer 17a is adaptively controlled by the parameter controller 35 so as to adjust the quantization steps to an optimum state. Therefore, the quantization steps can be changed between coarse quantization and fine quantization. It is assumed here that the image signals have a strong correlation between adjacent samples and, as a result, the error signals E(i) exhibit a distribution concentrated at or near zero. In this event, the fine quantization step may be indicated by the parameter controller 35 when a bit number of the quantized signal is kept unchanged.

On the other hand, when the quantization step is not changed irrespective of the distribution of the error signals E(i), it is possible to change the bit number of the quantized signal such that the distribution of the error signals E(i) is near zero. This means that the quantization step of the quantizer 17a may be kept unchanged. In this case, the dequantization characteristic of the local dequantizer 21a may be constant. However, the predictive functions are preferably changed from one to another so as to reduce the bit number of the error signals E(i). For this purpose, the intraframe coding might be changed to the interframe coding which enables a reduction of the bit number of the error signals E(i), in comparison with intraframe coding. Such a change of the predictive coding can be carried out by switching the predictive functions from one form to another.

When the image signals V(i) are coded by the use of the interframe coding alone, no error signal is produced on a leading image appearing at the beginning of reproduction from a normal rotation and on a trailing image appearing at the end of reproduction from a reverse rotation. Accordingly, the intraframe coding must be selected by the parameter controller 35 in connection with the image signals such that no error signal is produced. Taking this into consideration, the intraframe coding is also selected from time to time by the parameter controller 35.

In addition to the interframe coding and the intraframe coding, any other coding methods, such as moving compensation interframe coding, may also be used in the local predictor 23a.

At any rate, the recording signals RC are recorded on a CD-ROM 35 (FIG. 1) and read out of the CD-ROM 35 as recorded signals RI.

Figure 3:
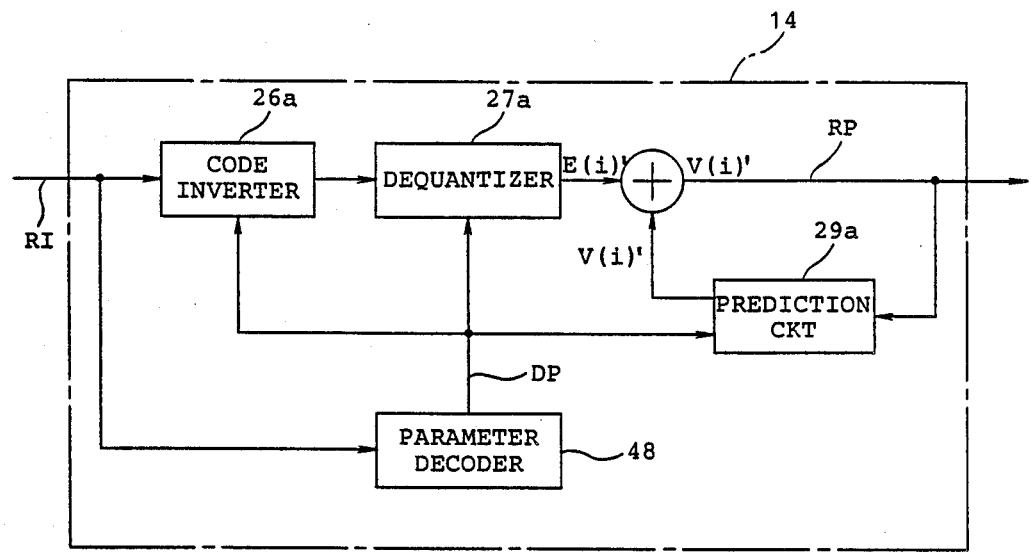
FIG. 3 is a block diagram of a reproduction system which is usable in combination with the recording system illustrated in FIG. 2.

Referring to FIG. 3, a reproduction system 12 for use in combination with the recording system illustrated in FIG. 2, is supplied with the recorded signals RI from the CD-ROM 35. The illustrated recorded signals such that they are RI carry the coded image signals adaptively controlled in the manner described in conjunction with FIG. 2 and the optimum parameters Ci are obtained with the coded image signals. As in FIG. 1, the reproduction system 12 is characterized by a decoder 14 in FIG. 3.

In FIG. 3, the decoder 14 comprises a parameter decoder 48 which responds to the recorded signals RI to decode the optimum parameters into decoded parameters DP. The decoded parameters DP are delivered from the parameter decoder 48 to a code inverter 26a, a dequantizer 27a, and a prediction circuit 29a, all of which can be adaptively controlled by the decoded parameters DP. The code converter 26a carries out code inversion of the coded image signals into a sequence of code inverted signals in accordance with a code inversion characteristic indicated by each decoded parameter DP. The code inverted signal sequence is successively dequantized by the dequantizer 27a into a sequence of dequantized signals which are reproductions of the error signals E(i) and may therefore be represented by E(i)'. The dequantized signals E(i)' are added by an adder 28 to a sequence of prediction signals V(i)' to produce a sequence of reproduced image signals RP. The dequantizer 27a and the predictor 29a are operated in accordance with a dequantization characteristic and a predictive function indicated by the decoded parameters DP, respectively, in a manner similar to that carried out in the recording system.

While the invention has thus far been described in conjunction with a preferred embodiment thereof, it will readily be possible for those skilled in the art to practice the invention in various other manners. For example, a spacial filter 49 may be placed between the local decoder 19 and the subtracter 16, as shown in FIG. 2. In this case, a cutoff frequency of the spacial filter 49 may adaptively be varied in accordance with the parameters. The error signals E(i) in FIG. 2 may be subjected to orthogonal transformation, motion compensation, and/or vector quantization. In order to carry out the orthogonal transformation, the quantizer 17a and the local dequantizer 21a may include an orthogonal transformation circuit and an orthogonal inverse transformation circuit, respectively. On the other hand, the vector quantization can be carried out by the quantizer 17a and the local dequantizer which include circuits for vector quantization and inverse vector quantization, respectively. It is possible to use any other read-only memory instead of the CD-ROM 10.

What is claimed is:

1. A recording method for recording a sequence of recording signals on a main recording medium in response to a sequence of image signals by carrying out redundancy reduction coding of said image signals with reference to a parameter, said recording method comprising the steps of:

adaptively changing said parameter so that said parameter is rendered as a controlled parameter and performing a redundancy reduction coding of said image signals in accordance with said controlled parameter and thereby producing a sequence of coded signals;

decoding said coded signals to obtain a sequence of decoded signals;

visually displaying said decoded signals on a display device to produce a sequence of images resulting from said decoded signals;

repeating said changing step, said decoding step, and said displaying step until an optimum sequence of images is obtained and designating the controlled parameter corresponding to said optimum sequence of images as an optimum parameter;

recording said optimum parameter on an additional recording medium together with said image signals corresponding thereto;

performing redundancy reduction coding of the image signals read out of said additional recording medium in accordance with said optimum parameter to produce a sequence of optimum coded signals; and writing said sequence of optimum coded signals together with said optimum parameter into said main recording medium.

2. A recording system for producing and recording on a main recording medium a sequence of recording signals, said sequence of recording signals being produced by subjecting a sequence of image signals representative of a sequence of images to redundancy reduction coding, said reduction coding being carried out by reference to a given parameter having certain attributes, said system comprising:

controlling means for adaptively altering the attributes of said given parameter on the basis of said image signals, thereby producing a controlled parameter for said recording system;

means for selecting from said controlled parameter an optimized parameter;

an additional recording medium for storing said image signals together with said controlled parameter;

readout means coupled to said additional recording medium for successively reading said controlled parameter out of said additional recording medium, said controlled parameter read out from said additional recording medium comprising a readout parameter;

coding means responsive to said image signals and coupled to said readout means and to said controlling means for successively coding said image signals into a sequence of coded signals by carrying out said redundancy reduction coding on the basis of said controlled parameter and said readout parameter until said optimized parameter has been selected;

combining means coupled to said readout means and to said coding means for combining said sequence of coded signals and said readout parameter into a sequence of combined signals; and means for writing said sequence of combined signals into said main recording medium as said sequence of recording signals, when said controlled parameter is defined as said optimized parameter.

3. The recording system of claim 2, wherein said coding means comprises:

subtracting means responsive to a sequence of internal signals and to said sequence of image signals and effective for subtracting said internal signals from said image signals to produce a sequence of error signals;

quantizing means coupled to said subtracting means and to said controlling means for quantizing said error signals into a sequence of quantized signals in accordance with said controlled parameter, said quantized signals comprising said coded signals;

decoding means coupled to said quantizing means and to said controlling means for decoding said quantized signals to obtain a sequence of decoded signals; and means for supplying said decoded signals to said subtracting means as said internal signals.

4. The recording system of claim 3, further comprising:

display means coupled to said local decoding means for visually displaying said local decoded signals.

* * * * *